US010428710B2

(12) United States Patent
Schepers et al.

(10) Patent No.: US 10,428,710 B2
(45) Date of Patent: Oct. 1, 2019

(54) INJECTOR HAVING A REINFORCED SPRAY DISC

(71) Applicant: Continental Automotive GmbH, Hannover (DE)

(72) Inventors: Sven Schepers, Troisdorf (DE); Rolf Brück, Bergisch Gladbach (DE)

(73) Assignee: Continental Automotive GmbH, Hannover (DE)

( * ) Notice: Subject to any disclaimer, the term of this patent is extended or adjusted under 35 U.S.C. 154(b) by 16 days.

(21) Appl. No.: 15/569,515

(22) PCT Filed: Apr. 25, 2016

(86) PCT No.: PCT/EP2016/059145
§ 371 (c)(1),
(2) Date: Oct. 26, 2017

(87) PCT Pub. No.: WO2016/173974
PCT Pub. Date: Nov. 3, 2016

(65) Prior Publication Data
US 2018/0328251 A1    Nov. 15, 2018

(30) Foreign Application Priority Data

Apr. 27, 2015    (DE) .................. 10 2015 207 715

(51) Int. Cl.
*F01N 3/20*    (2006.01)
(52) U.S. Cl.
CPC ........ *F01N 3/2066* (2013.01); *F01N 2260/10* (2013.01); *F01N 2260/12* (2013.01);
(Continued)

(58) Field of Classification Search
CPC .......... F01N 3/10; F01N 3/208; F01N 3/2066; F01N 13/009; F01N 2610/02; F01N 2610/06; F01N 2610/08; F01N 2610/10; F01N 2610/14; F01N 2610/1561; F01N 2240/30; F01N 2260/18; B01J 29/072; B01J 35/04; B01J 37/0246; Y02T 10/24
(Continued)

(56) References Cited

U.S. PATENT DOCUMENTS 4,057,190 A    11/1977   Kiwior et al.
7,021,570 B2    4/2006   Tani et al.
(Continued)

FOREIGN PATENT DOCUMENTS

DE    10 68 948 B    9/1956
DE    25 28 683 A1    1/1976
(Continued)

*Primary Examiner* — Patrick D Maines
*Assistant Examiner* — Dapinder Singh
(74) *Attorney, Agent, or Firm* — Cozen O'Connor

(57) ABSTRACT

An injector for adding a liquid additive into an exhaust gas treatment apparatus includes at least one nozzle having a spray disc configured to inject the liquid additive into the exhaust gas treatment apparatus. The spray disc has: at least one spray duct, through which flow of the liquid additive can pass, the spray duct having an outlet opening configured to shape a spray jet of the liquid additive. The spray disc has a reinforcing structure arranged downstream of the outlet opening, the reinforcing structure being configured such that it is not wetted by the spray jet.

10 Claims, 3 Drawing Sheets

(52) U.S. Cl.
CPC ...... *F01N 2260/18* (2013.01); *F01N 2610/02* (2013.01); *F01N 2610/1453* (2013.01); *Y02T 10/24* (2013.01)

(58) Field of Classification Search
USPC .......................................... 60/286, 295, 317
See application file for complete search history.

(56) References Cited

U.S. PATENT DOCUMENTS

| | | | |
|---|---|---|---|
| 7,278,625 B2 | 10/2007 | Huber et al. | |
| 7,798,433 B2 | 9/2010 | Onishi et al. | |
| 8,528,844 B2 | 9/2013 | Maus et al. | |
| 8,740,113 B2* | 6/2014 | Roessle | F01N 3/2066 |
| | | | 239/585.1 |
| 8,910,884 B2* | 12/2014 | Thomas | F01N 3/28 |
| | | | 239/127 |
| 2006/0196172 A1* | 9/2006 | Johnson | B01D 53/90 |
| | | | 60/286 |

FOREIGN PATENT DOCUMENTS

| | | |
|---|---|---|
| DE | 103 19 920 A1 | 5/2004 |
| DE | 603 02 124 T2 | 7/2006 |
| DE | 10 2006 017 006 A1 | 5/2007 |
| DE | 10 2009 002290 A1 | 10/2009 |
| DE | 10 2009 034 072 A1 | 1/2011 |
| EP | 1 339 956 B1 | 9/2003 |
| EP | 1 698 768 A1 | 9/2006 |

\* cited by examiner

INJECTOR HAVING A REINFORCED SPRAY DISC

CROSS-REFERENCE TO RELATED APPLICATIONS

This is a U.S. national stage of application No. PCT/EP2016/059145, filed on 25 Apr. 2016, which claims priority to the German Application No. 10 2015 207 715.2 filed 27 Apr. 2015, the content of both incorporated herein by reference.

BACKGROUND OF THE INVENTION

1. Field of the Invention

The invention relates to an injector for adding a liquid additive into an exhaust gas treatment apparatus.

2. Related Art

Exhaust gas treatment apparatuses, to which an additive is fed, are known. In exhaust gas treatment apparatuses of this type, special exhaust gas purification methods take place, in which the exhaust gas of a connected internal combustion engine is purified with the aid of the additive. For example, defined pollutant constituent parts in the exhaust gas can be converted by way of the additive to produce harmless substances. For example, water, fuel, oxidizing agent and/or reducing agent can be used as "liquid" additive.

An exhaust gas purification method frequently carried out is the method of selective catalytic reduction (SCR method), in which a reducing agent is added to the exhaust gas, by way of which reducing agent nitrogen oxide compounds in the exhaust gas are reduced to form nitrogen, water and $CO_2$. Ammonia is preferably used as reducing agent. Ammonia is normally not itself stored in motor vehicles, but rather is stored in the form of a liquid additive that can be converted to form the actual reducing agent when required. For example, aqueous urea solution can be used as liquid additive. A suitable 32.5% aqueous urea solution is available under the commercial name AdBlue®.

In particular, an injector is a possibility for adding liquid additive into an exhaust gas treatment apparatus. The injector should be of correspondingly high temperature-resistant design on account of the typically high temperatures of the exhaust gases in an exhaust gas treatment apparatus. A valve that can be opened and closed in order to feed in the liquid additive in a controlled manner is frequently arranged in the injector. A valve of this type is, as a rule, particularly temperature-sensitive and should therefore be protected against the high temperatures of the exhaust gas treatment apparatus.

It is a further problem that aqueous additives (in particular, a reducing agent) can freeze at low ambient temperatures. The above-described 32.5 urea/water solution AdBlue® already freezes, for example, at −11° C. Low temperatures of this type can occur in a motor vehicle, for example, during long parked periods. The additive expands during freezing. In such a case, the injector can be damaged if additive is still situated in the injector in the case of freezing.

Moreover, it is, as a rule, necessary that the liquid additive is fed into the exhaust gas in a finely atomized manner, to ensure satisfactory and complete evaporation in the exhaust gas treatment apparatus and complete conversion to form the actual reducing agent.

Fine atomization can be achieved, for example, by a spray disc that forms a nozzle for the atomized addition of the liquid additive to the exhaust gas treatment apparatus.

SUMMARY OF THE INVENTION

Proceeding from the above issues relating to the prior art, it is an object of the present invention to specify an injector for injecting a liquid additive into an exhaust gas treatment apparatus, which injector at least partially solves the technical problems addressed above. In particular, the novel injector is not damaged by freezing of the additive, makes possible fine atomization of liquid additive in the exhaust gas treatment apparatus, and is particularly resistant to high temperatures.

The features described herein in relation to the present invention individually can be combined with one another in any desired, technologically appropriate way, and can be supplemented by explanatory facts from the description, further design variants of the invention being indicated.

According to one aspect, the present invention relates to an injector for adding a liquid additive into an exhaust gas treatment apparatus. The injector has at least one nozzle formed by a spray disc for injecting the liquid additive into the exhaust gas treatment apparatus, the spray disc having at least one spray duct, through which flow can pass, with an outlet opening, the outlet opening being configured such that it shapes a spray jet, and the spray disc being formed downstream of the outlet opening by a reinforcing structure, the reinforcing structure being configured such that it is not wetted by the spray jet.

The present technical solution is based on the concept of reinforcing a spray disc by a reinforcing structure, with the result that the spray disc can also withstand high ice pressures in the injector.

An injector denotes a component that can be in contact, for example, with an opening provided for this purpose in the wall of an exhaust gas treatment apparatus or exhaust gas line. Therefore, the injector can be installed, attached and/or flange-connected to the exhaust gas treatment apparatus in a manner that is permanent or in a manner that can be released again, but is preferably gas-tight. The injector is formed, for example, in the manner of an injection valve or the like that, in particular, can be operated in a controlled manner and/or operates automatically (in a pressure-dependent manner).

As viewed in the flow direction, the spray disc or the nozzle formed by the spray disc forms the last station of the liquid additive within the injector before the entry into the exhaust gas treatment apparatus. The nozzle injects the liquid additive into the exhaust gas treatment apparatus, in particular into the exhaust gas line. The nozzle is intended to shape or to generate a predefined spray pattern or a predefined spray cone. To this end, the nozzle is formed by a spray disc. The spray disc has at least one spray duct and preferably a multiplicity of spray ducts intended to generate droplets of the liquid additive.

The spray duct can be flowed through by the liquid additive. This also means, in other words, that the spray duct penetrates the spray disc (completely) in the flow direction. The spray disc is of disc-shaped or plate-shaped formation.

In cross section, the spray disc is preferably of round, in particular circular or oval, formation. This is not compulsory, however, because the spray disc can also be of polygonal, in particular rectangular, preferably square, formation. The spray duct preferably runs transversely, in particular perpendicularly, with respect to the substantially planar transverse extent of the spray disc. This is not compulsory, however, because the spray duct can also be of at least partially inclined configuration. The spray duct can have a round, in particular circular or oval, duct cross section or a polygonal, in particular rectangular, preferably square, duct cross section, depending on which shape of the spray duct is particularly advantageous for the configuration of a spray cone of the liquid additive.

The at least one spray duct has an outlet opening configured such that it shapes or forms a spray jet or a spray cone and/or a spray pattern. Here, the outlet opening relates, in particular, to a constriction of the spray duct.

The spray disc is formed by a reinforcing structure downstream of the outlet opening. Here, the terms "downstream" and "upstream" relate to the flow direction of the additive through the spray duct. In other words, the reinforcing structure is formed on an underside or on a side of the spray disc oriented toward the exhaust gas treatment apparatus. The reinforcing structure can be formed by at least one reinforcing rib, at least one reinforcing disc, by an additional application of material, or the like. The reinforcing structure makes it possible for the spray disc to be able to withstand high ice pressures.

During the production of the injector, the spray disc is preferably an individual component that, in order to configure the finished injector, can be placed onto the latter and, for example, can be welded or brazed here. This makes an individual adaptation of the injector possible by the selection and mounting of an adapted spray disc suitable for the respective application.

The reinforcing structure is configured such that it is not wetted by the spray jet. Here, "not wetted" means, in particular, that an (inner) surface of the reinforcing structure is at least not covered completely by liquid additive. In other words, this also means that the spray jet is not oriented directly onto the reinforcing structure and/or does not make direct contact with the reinforcing structure (during normal operation of the exhaust gas system). The spray jet frequently has the shape of a spray cone. The reinforcing structure is preferably configured such that it is not wetted or tangent to or intersected by the spray cone. In other words, this also means that the reinforcing structure does not contribute to the shaping of the spray jet.

The spray disc is preferably formed in one part or in one piece. This is not compulsory, however, because the spray disc can also be formed in multiple parts, in particular by a plurality of discs connected to one another. If the spray disc is formed in one part, the spray disc can be understood (theoretically) to be divided into a base section and a reinforcing section, both "theoretical" sections likewise being in each case disc-shaped.

It is proposed in accordance with one advantageous refinement that the reinforcing structure is formed by a reinforcing section of the spray disc, the at least one spray duct extending through the reinforcing section, as viewed in a flow direction, from the outlet opening with a duct cross section which widens suddenly.

A dividing plane lies (theoretically) between the spray disc, in particular a base section of the spray disc, and the reinforcing structure, in particular a reinforcing section of the spray disc or a supporting disc. The outlet openings of the spray ducts lie in the dividing plane.

If the spray ducts extend further through the reinforcing structure, an abrupt or rapid and/or sudden widening or increase of the duct cross section of the spray duct is effected in the region of the outlet openings. This can ensure that the spray jet or the spray cone is shaped only by the outlet openings and is not influenced by the reinforcing structure.

Here, the abrupt widening of the duct cross section lies at the level of the outlet opening as viewed in the flow direction. The abrupt cross-sectional widening can be formed in the manner of a step (which runs around in the circumferential direction) or a collar or the like.

It is proposed, in accordance with one advantageous refinement, that the reinforcing structure is formed by a supporting disc, the supporting disc and the spray disc being connected to one another, the at least one spray duct extending through the supporting disc, as viewed in a flow direction, from the outlet opening with a duct cross section that widens suddenly. If a supporting disc is provided, the spray disc has, in particular, a multiple-part construction comprising the (main) spray disc and the supporting disc.

It is proposed according to one advantageous refinement that the spray disc and the supporting disc are connected to one another in an integrally joined manner. Here, an "integrally joined" connection is understood to mean a "material to material connection". The spray disc and the supporting disc are preferably connected to one another by a welded connection or brazed connection, in particular a hard brazed connection.

It is proposed in accordance with a further advantageous refinement that the at least one spray duct is formed upstream of the outlet opening by way of a first duct section and downstream of the outlet opening by way of a second duct section, the first duct section having a reduced duct cross section, and the second duct section having a widened duct cross section, and a ratio of the reduced duct cross section to the widened duct cross section being less than 0.8. A ratio of the reduced duct cross section to the widened duct cross section is preferably less than 0.66 and particularly preferably less than 0.5 or even less than 0.33.

On account of the sudden cross-sectional widening of the spray duct, the widened duct cross section spans or covers the reduced duct cross section (completely) as viewed in or counter to the flow direction. This has the advantage that the spray pattern or the spray cone and/or the droplet sizes is/are not influenced by the second duct section. Here, in other words, the outlet opening is the outlet opening of the first duct section of the spray duct and lies in the region of the sudden cross-sectional widening.

Here, a duct section relates to a part region of the spray duct along the flow direction. In all the duct sections, the spray ducts have a duct inner wall, along which the liquid additive can stream or flow. The first duct section and the second duct section are connected to one another in a fluid-conducting manner. The duct sections can be formed, for example, by way of bores, in particular through bores, recesses or the like in the spray disc.

It is proposed in accordance with a further advantageous refinement that the at least one spray duct is formed upstream of the outlet opening by way of a first duct section and downstream of the outlet opening by way of a second duct section, the first duct section having a first section length, and the second duct section having a second section length, and a ratio of the first section length to the second section length being less than or equal to 1. A ratio of the first section length to the second section length is preferably less than 0.8 and particularly preferably less than 0.66 or even less than 0.33. The section length relates to a length along the flow direction.

In terms of absolute length specifications, the first section length amounts, for example, to from 100 μm to 300 μm [micrometers], and the second section length amounts to from 300 μm to 800 μm [micrometers]. The first section length preferably lies in a range from 135 μm to 180 μm

[micrometers], and the second section length lies in a range from 380 μm to 580 μm [micrometers]. The first section length can be very thin in comparison with the second section quantity, because the reinforcing structure formed by the reinforcing section or by the supporting disc supports that part of the spray disc that forms the first duct section with the first section length. A thin spray disc makes a particularly precise and satisfactory spray formation possible that, in particular, is particularly independent of the sprayed quantity of liquid additive.

It is proposed in accordance with yet another advantageous refinement that a compensation element is arranged in the injector. The compensation element can serve to compensate for a rising ice pressure on account of the volumetric increase of the aqueous additive in the case of freezing. The compensation element can be formed by at least one spring, at least one compressible or deformable (gas-filled) bellows, at least one elastic tab, in particular a rubber tab, or the like. The compensation element can be held, supported or fastened on a connecting region of the injector. Moreover, the compensation element can be capable of being brought into contact with a valve unit in the injector.

The compensation element in the injector affords the advantage that the injector can be protected against damage on account of an internal ice pressure. Prestressing of the entire injector, for example by an external spring between an outer housing and the injector, can therefore be avoided. This has the advantage that a relative movement of the seals of the injector in the housing can be avoided.

As a result of the reinforcing structure, the spray disc has an increased strength which prevents a deformation of the spray disc if ice pressure occurs. By a compensation element which is configured on the connecting region of the injector, the increased stiffness of the spray disc can be compensated for, by the compensation element opening up additional volume on the connecting region if ice pressure occurs within the injector.

It is proposed, in accordance with yet another advantageous refinement, that at least one fluid distribution structure is formed in the spray disc upstream of the at least one spray duct. The fluid distribution structure feeds the liquid additive to the individual spray ducts in as homogeneous a manner as possible. The fluid distribution structure can be configured by at least one recess, bore, milled portion or the like. In other words, the fluid distribution structure is made in an upper side of the spray disc. In the region of the upper side, the fluid distribution structure can connect a plurality of spray ducts, in particular spray duct inlets, to one another. In other words, the fluid distribution structure can also be described as a local reduction in the thickness of the spray disc.

It is proposed in accordance with yet another advantageous refinement that the at least one spray duct is formed upstream of the outlet opening by a first duct section and downstream of the outlet opening by a second duct section, at least one of the second duct sections being oriented eccentrically with respect to the associated first duct section. Here, the eccentric orientation relates to the respective center axes of the duct sections, which do not lie on one another in the case of an eccentric orientation. An eccentric orientation has the advantage that the spray jet or the spray cone can be adapted to the direction of the exhaust gas flow. The exhaust gas flow will normally deflect the spray jet in the exhaust gas flow direction. Here, the eccentric orientation can help the spray jet not to pass into contact with the reinforcing structure. The second duct section is preferably arranged eccentrically with respect to the first duct section such that more space is available for a spray cone of the injector in the second duct section in the exhaust gas flow direction.

In accordance with a further aspect, a motor vehicle is also proposed, at least having an internal combustion engine, and an exhaust gas treatment apparatus for purifying the exhaust gases of the internal combustion engine, an injector (as has been described in the preceding text) for adding the liquid additive being provided on the exhaust gas treatment apparatus.

BRIEF DESCRIPTION OF THE DRAWINGS

The invention and the technical environment will be described in greater detail in the following text using the Figures. The Figures show particularly preferred exemplary embodiments, to which the invention is not restricted, however. It is to be noted, in particular, that the Figures and, in particular, the proportions which are shown are merely diagrammatic. In the Figures, diagrammatically.

DETAILED DESCRIPTION OF THE PRESENTLY PREFERRED EMBODIMENTS

Figure 1:
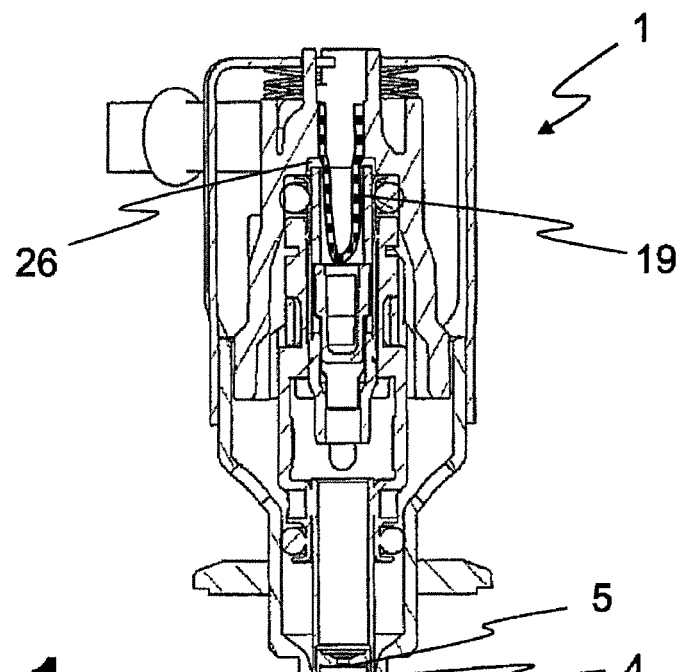
FIG. 1 shows a sectional illustration of an injector.

FIG. 1 shows a sectional illustration of an injector 1. The injector 1 has a nozzle 5 formed by a spray disc 4 for injecting a liquid additive into the exhaust gas treatment apparatus. In addition, a compensation element 19 in the manner of an elastic sleeve is provided in the injector 1. The compensation element 19 is arranged in a connecting region 26 of the injector 1.

Figure 2:
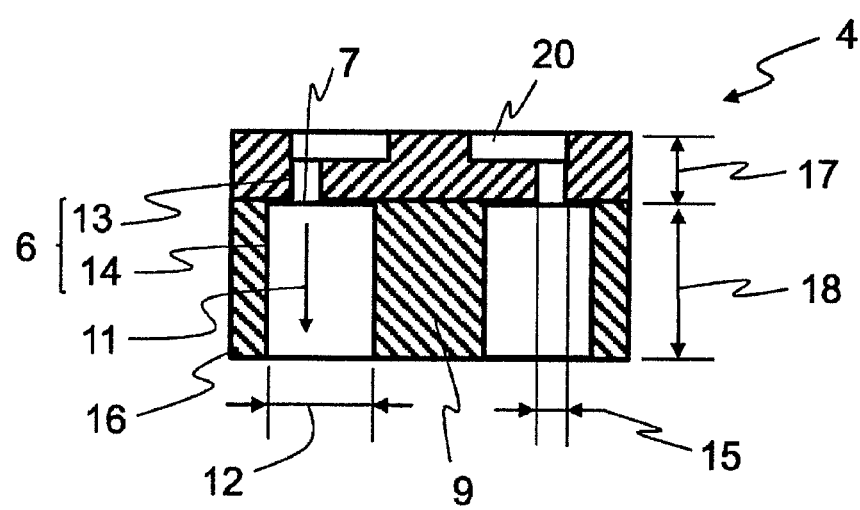
FIG. 2 shows a sectional illustration of a spray disc.

FIG. 2 shows a sectional illustration of a spray disc 4. The spray disc 4 has two spray ducts 6, through which flow can pass, with in each case one outlet opening 7. It can be seen that the spray disc 4 is formed downstream of the outlet openings 7 by a reinforcing structure 9. As a result, the spray disc 4 is reinforced on its underside by the reinforcing structure 9, with the result that the spray disc 4 can withstand even high ice pressures in the injector 1.

Here, the spray disc 4 is formed in two parts, the outlet openings 7 lying in an imaginary dividing plane of the spray disc 4.

In accordance with the illustration according to FIG. 2, the reinforcing structure 9 is formed by a supporting disc 16, the supporting disc 16 and the spray disc 4 being connected fixedly to one another. Here, the spray ducts 6 extend through the supporting disc 16, as viewed in a flow direction 11, from the outlet opening 7, and have a duct cross section 12 widened suddenly there in comparison with a first duct section 13.

The spray ducts 6 are formed upstream of the outlet openings 7 in each case by a first duct section 13 and downstream of the outlet openings 7 in each case by a second duct section 14. The first duct section 13 has a reduced duct cross section 15, and the second duct section 14 has a widened duct cross section 12. In addition, the first duct section 13 has a first section length 17, and the second duct section 14 has a second section length 18. A fluid distribution structure 20 is formed in the spray disc 4 upstream of the respective spray duct 6, through which fluid distribution structure 20 the liquid additive can be introduced into the spray ducts 6.

Figure 3:
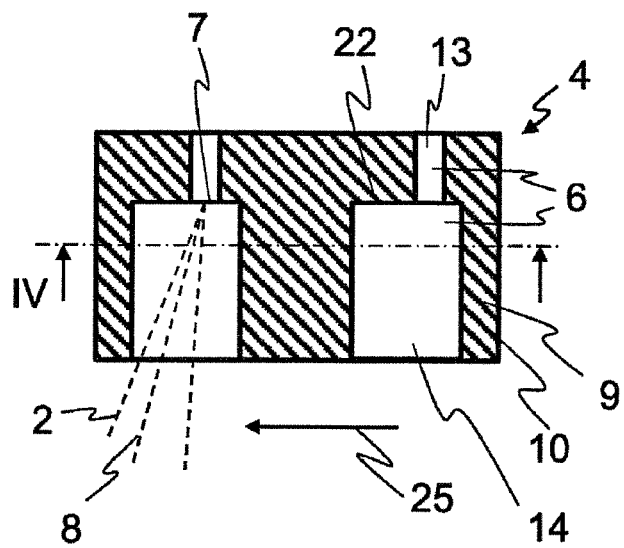
FIG. 3 shows a sectional illustration of a further spray disc.
Figure 4:
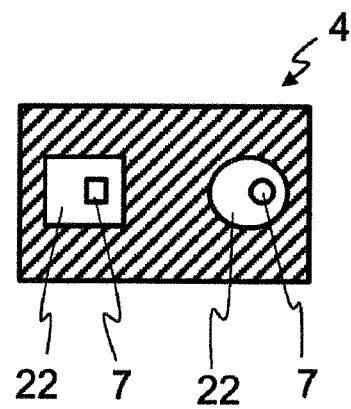
FIG. 4 shows a sectional illustration of yet another spray disc.
Figure 5:
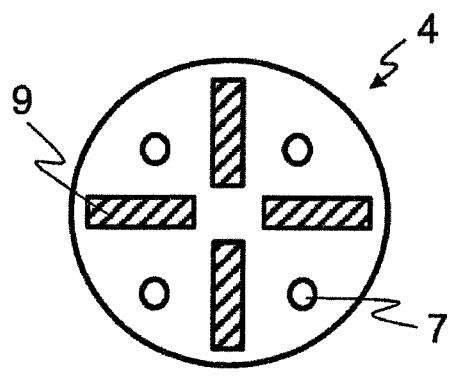
FIG. 5 shows a view from below of a spray disc.
Figure 6:
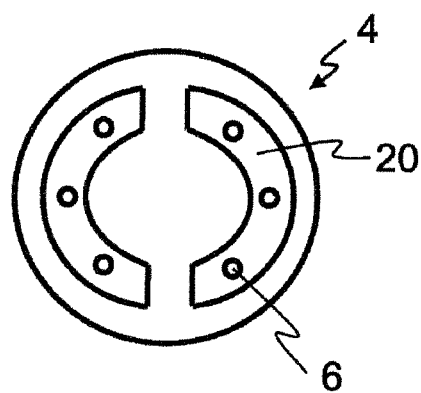
FIG. 6 shows a view from above of a spray disc.
Figure 7:
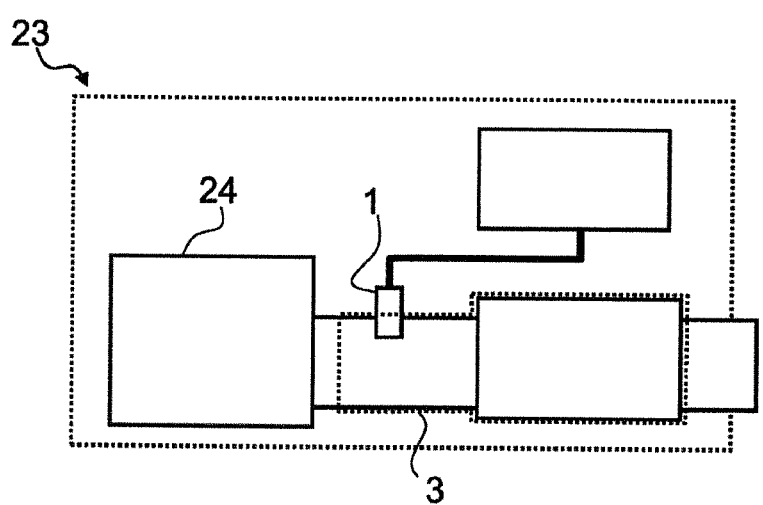
FIG. 7 shows a motor vehicle having an injector.

FIG. 3 shows a sectional illustration of a spray disc 4 formed in one part or in one piece. Here, the reinforcing structure 9 is formed by a reinforcing section 10 of the spray disc 4. In other words, the spray disc 4 is already provided here per se from a (single) thick disc, the second duct sections 14 of the spray ducts 6 being formed in the reinforcing section 10 of the spray disc 4 in the manner of bores and/or recesses. This also means that the reinforcing structure 9 is not applied to a thin main disc here, but rather is machined out of a thick spray disc 4 by bores and/or recesses. In the region of the outlet openings 7, the spray ducts 6 are configured by a sudden cross-sectional widening, which forms a type of step 22.

It can be seen in FIG. 3 that the second duct sections 14 are oriented eccentrically with respect to the respective associated first duct sections 13. This achieves a situation where the spray jet 8 of the additive 2 does not pass into direct contact with a duct inner face of the second duct section 14, although a spray jet 8 is deformed partially on account of the flowing exhaust gas 25. It is also possible here that the first duct sections 13 and/or the second duct sections 14 have widening or tapering cross sections.

FIG. 4 shows a sectional illustration of a further spray disc 4 which can correspond, for example, to the spray disc from FIG. 3. FIG. 3 is not restricted, however, to spray discs having a sectional face in accordance with FIG. 4. The possible sectional plane is denoted by IV in FIG. 3 and lies in the region of the reinforcing section 10. The view is directed from below onto the step 22 and the outlet openings 7 here. Here, the spray disc 4 has a rectangular cross section by way of example. The step 22 and the outlet opening 7 of the spray duct 6 shown on the left hand side have a rectangular cross section by way of example. In contrast, the step 22 and the outlet opening 7 of the spray duct 6 shown on the right hand side are formed by way of example with an oval shape. It is to be noted that FIG. 4 is merely diagrammatic and shows two different spray duct shapes in order to illustrate different shapes. Actual spray discs usually have, in each case, "only" one defined type of duct shapes.

FIG. 5 shows a view from below of a spray disc 4. The spray disc 4 is formed on the underside by a reinforcing structure 9. Here, the reinforcing structure 9 is formed by way of example by four reinforcing ribs, the reinforcing ribs being shown in a sectioned manner here. Since the view is directed from below onto the spray disc 4, outlet openings 7 can also be seen.

FIG. 6 shows a view from above onto a spray disc 4. A fluid distribution structure 20 is formed in the spray disc 4 in an upper region. Here, the fluid distribution structure 20 is configured with two arcuate recesses. It is shown that each of the recesses connects three spray ducts 6 to one another. In other words, in each case three spray ducts 6 extend from a recess of the fluid distribution structure 20 into the spray disc 4 and through the spray disc 4.

FIG. 7 shows a motor vehicle 23, at least having an internal combustion engine 24, and an exhaust gas treatment apparatus 3 for purifying the exhaust gases of the internal combustion engine 24, an injector 1 for adding the liquid additive being provided on the exhaust gas treatment apparatus 3.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An injector (1) for adding a liquid additive (2) into an exhaust gas treatment apparatus (3), the injector (1) comprising:

at least one nozzle (5) having a spray disc (4) configured to inject the liquid additive (2) into the exhaust gas treatment apparatus (3), the spray disc (4) having:

at least one spray duct (6), through which flow of the liquid additive (2) can pass, the at least one spray duct (6) having an outlet opening (7) configured to shape a spray jet (8) of the liquid additive (2), wherein the spray disc (4) has a reinforcing structure (9) arranged downstream of the outlet opening (7), the reinforcing structure (9) being configured such that it is not wetted by the spray jet (8), and wherein the at least one spray duct (6) has, upstream of the outlet opening (7), a first duct section (13) and has, downstream of the outlet opening (7), a second duct section (14), the first duct section (13) having a first duct cross section (15), and the second duct section (14) having a second duct cross section (12) wider than the first duct cross section (15), the second cross section (12) widening from the first duct cross section (15) without graduation.

2. The injector as claimed in claim 1, wherein the reinforcing structure (9) comprises a reinforcing section (10) of the spray disc (4), the at least one spray duct (6) extending through the reinforcing section (10), as viewed in a flow direction (11), from the outlet opening (7).

3. The injector as claimed in claim 1, wherein the reinforcing structure (9) comprises a supporting disc (16), the supporting disc (16) and the spray disc (4) being connected to one another, the at least one spray duct (6) extending through the supporting disc (16), as viewed in a flow direction (11), from the outlet opening (7).

4. The injector as claimed in claim 3, wherein the spray disc (4) and the supporting disc (16) are connected to one another in an integrally joined manner.

5. The injector as claimed in claim 1, wherein the first duct section (13) has a first section length (17), and the second duct section (14) has a second section length (18), and a ratio of the first section length (17) to the second section length (18) is less than or equal to 1.

6. The injector as claimed in claim 1, further comprising a compensation element (19) arranged in the injector (1).

7. The injector as claimed in claim 1, further comprising at least one fluid distribution structure (20) arranged in the spray disc (4) upstream of the at least one spray duct (6).

8. The injector as claimed in claim 1, wherein the second duct section (14) is oriented eccentrically with respect to the first duct section (13).

9. A motor vehicle (23) comprising:
an internal combustion engine (24);
an exhaust gas treatment apparatus (3) configured to purify exhaust gases of the internal combustion engine (24); and
the injector (1) as claimed in claim 1 configured to add the liquid additive (2) into the exhaust gas treatment apparatus (3).

10. An injector (1) for adding a liquid additive (2) into an exhaust gas treatment apparatus (3), the injector (1) comprising:
at least one nozzle (5) having a spray disc (4) configured to inject the liquid additive (2) into the exhaust gas treatment apparatus (3),
the spray disc (4) having:
at least one spray duct (6), through which flow of the liquid additive (2) can pass, the at least one spray duct (6) having an outlet opening (7) configured to shape a spray jet (8) of the liquid additive (2),
wherein the spray disc (4) has a reinforcing structure (9) arranged downstream of the outlet opening (7), the reinforcing structure (9) being configured such that it is not wetted by the spray jet (8), and
wherein the at least one spray duct (6) has, upstream of the outlet opening (7), a first duct section (13) and has, downstream of the outlet opening (7), a second duct section (14), the first duct section (13) having a first duct cross section (15), and the second duct section (14) having a second duct cross section (12) wider than the first duct cross section (15), a ratio of the first duct cross section (15) to the second duct cross section (12) being less than 0.8.

* * * * *